United States Patent [19]

Kuznicki et al.

[11] Patent Number: 5,047,763

[45] Date of Patent: Sep. 10, 1991

[54] SELECTIVE CALL SYSTEM WITH MESSAGE REBROADCASTING OVER ANOTHER SELECTIVE CALL SYSTEM

[75] Inventors: William J. Kuznicki, Coral Springs; Robert J. Schwendeman, Pompano Beach, both of Fla.

[73] Assignee: Motorola, Inc., Schaumburg, Ill.

[21] Appl. No.: 444,489

[22] Filed: Nov. 30, 1989

[51] Int. Cl.⁵ .................. G08B 7/00; H04Q 7/00; H04M 11/02; H04B 7/15

[52] U.S. Cl. .................... 340/825.44; 379/57

[58] Field of Search .......... 379/219, 220, 221, 57, 379/58, 63, 56; 340/825.26, 825.27, 825.44; 455/33, 34

[56] References Cited

U.S. PATENT DOCUMENTS

| | | | |
|---|---|---|---|
| 3,976,995 | 8/1976 | Sebestyen | 340/825.44 |
| 4,178,476 | 12/1979 | Frost | 379/57 |
| 4,424,514 | 1/1984 | Fennell et al. | 340/825.52 |
| 4,506,262 | 3/1985 | Vance et al. | 340/825.44 |
| 4,518,961 | 5/1985 | Davis et al. | 340/825.44 |
| 4,644,347 | 2/1987 | Lucas et al. | 340/825.04 |
| 4,677,434 | 6/1987 | Fascenda | 340/825.27 |
| 4,741,049 | 4/1988 | De Jager et al. | 455/34 |
| 4,748,681 | 5/1988 | Schmidt | 455/33 |
| 4,785,450 | 11/1988 | Bolgiano et al. | 455/34 |
| 4,792,984 | 12/1988 | Matsuo | 455/34 |
| 4,814,763 | 3/1989 | Nelson et al. | 379/56 |
| 4,825,193 | 4/1989 | Siwiak et al. | 340/311.1 |
| 4,875,038 | 10/1989 | Siwiak et al. | 379/57 |
| 4,910,511 | 3/1990 | Nagata et al. | 340/825.44 |
| 4,914,649 | 4/1990 | Schwendeman et al. | 340/825.44 |

OTHER PUBLICATIONS

Walter L. Morgan and Gary D. Gordon, *Communications Satellite Handbook*;, Published 1989, pp. 85–87.

Primary Examiner—Donald J. Yusko
Assistant Examiner—John Giust
Attorney, Agent, or Firm—Daniel R. Collopy; Vincent B. Ingrassia; William E. Koch

[57] ABSTRACT

A method and apparatus selectively rebroadcasts information received from a first selective call network system by a second selective call network system. A selective call receiver monitors the messages broadcast by the first selective call network system and, when no messages comprising the preamble code of the selective call receiver are received, the selective call receiver will, from time to time, monitor the messages transmitted by the second selective call network, including the messages rebroadcast from the first selective call network system.

23 Claims, 7 Drawing Sheets

SELECTIVE CALL SYSTEM WITH MESSAGE REBROADCASTING OVER ANOTHER SELECTIVE CALL SYSTEM

FIELD OF THE INVENTION

This invention relates in general to selective call network systems, and in particular to selective call receivers capable of reception in more than one selective call network system.

BACKGROUND OF THE INVENTION

With the proliferation of selective call services, many users of selective call receivers typically receive messages on more than one service. For example, a user could subscribe to a wide area network system and at least one on-site network system. Wide area network systems typically allow for reception of selective call messages over a large area such as an urban area, or even statewide. On-site selective call network systems have a localized coverage area, some solely within one building. Each selective call network system (e.g., paging systems) is assigned a unique frequency in a manner such that systems proximately located to each other will operate on distinct and separate selective call communications paths or frequencies called channels.

It is desirable that the reception of a message by a selective call receiver (e.g., a pager) have a high probability of reception. To insure a high probability of selective call message reception, a message is typically transmitted by a wide area network selective call system having an associated coverage area wherein a selective call receiver user is normally found.

If a selective call message is being transmitted for the user by a wide area network system and the user is in a building, there can be difficulty in reception because of the interference of the surrounding building. For example, a doctor on staff at one or more hospitals within an urban area and residing within that urban area typically receives messages on a wide area selective call network system and one or more on-site selective call network systems operated by the hospitals. If the doctor is inside a hospital and the selective call receiver is tuned to the on-site selective call system frequency, he cannot receive transmissions from the surrounding wide area network system. To increase the probability of message reception, the doctor may use two pagers: one for the wide area network and one for the on-site network. The doctor's selective call receiver may also scan between the wide area and on-site channels to increase the probability of message reception. An example of two channel scanning is described in U.S. Pat. No. 4,644,347 assigned to the assignee of the present invention. While a selective call message is being received on one channel, though, the other channels are not scanned. A message transmitted for a user on one frequency, therefore, could not be received by the user if he is receiving a message concurrently on another frequency.

Thus, what is needed is a system for increased reliability of selective call message reception in a wide area selective call network system even if the user is in a location which interfers with signal reception or is receiving messages from an on-site selective call network system.

SUMMARY OF THE INVENTION

Accordingly, it is an object of the present invention to provide improved selective call message reception.

In carrying out the above and other objects of the invention in one form, there is provided a method and apparatus for selectively transmitting information received from a first selective call network system by a second selective call network system. A selective call receiver monitors information broadcast on the first selective call network system for predetermined messages and periodically monitors information on the second selective call network system when the predetermined messages are not present on the first selective call network system.

DETAILED DESCRIPTION OF THE INVENTION

Figure 1:
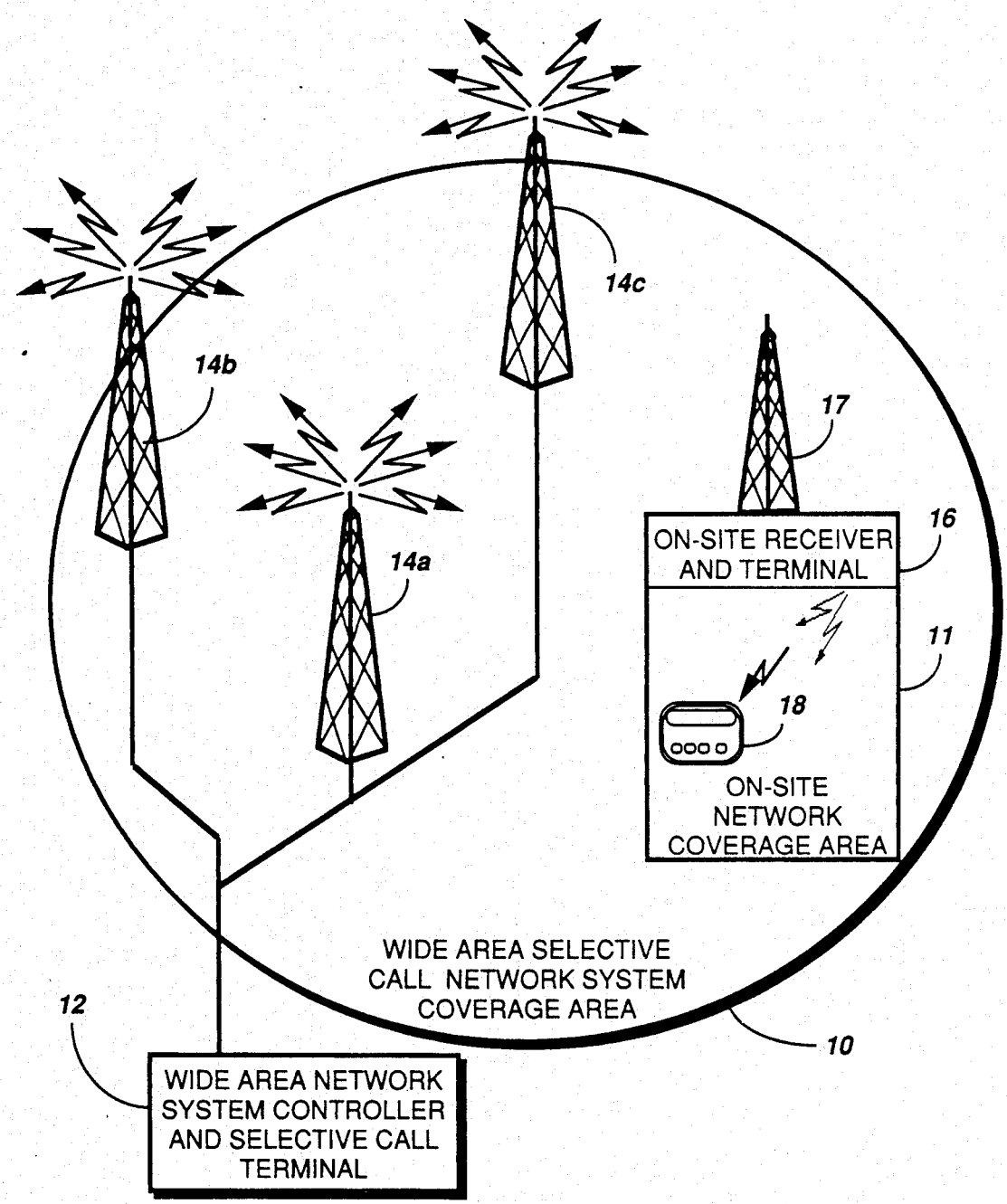
FIG. 1 is a diagram of the preferred embodiment of the present invention.

Referring to FIG. 1, a wide area selective call network system, such as a wide area paging service, has a network coverage area 10 and has an on-site selective call network system (e.g., an on-site paging service) with an on-site network coverage area 11 located therein. The wide area selective call network system comprises a system controller and selective call terminal 12. The system controller provides messages for transmission to and receives signals from a plurality of transmitters/receivers 14a, 14b and 14c, the coverage area of the transmitters 14a, 14b and 14c defining the wide area network system coverage area 10. The transmitters/receivers 14a, 14b and 14c transmit messages from the system controller and selective call terminal 12 to selective call receivers located within the wide area network system coverage area 10. The transmitters/receivers 14a, 14b and 14c can also receive acknowledge back (ack-back) signals from the selective call receivers located within coverage area 10, providing those signals to the system controller and selective call terminal 12. Acknowledge back signalling is disclosed in U.S. Pat. No. 4,825,193, assigned to the assignee of the present invention and the teachings of which are hereby incorporated by reference.

The on-site selective call network system comprises a terminal 16 and an on-site network coverage area 11 with a receiver 17 located within the wide area network coverage area 10. The receiver 17 is capable of receiving transmissions from the transmitters 14a, 14b and 14c. The terminal 16 can transmit selective call messages to selective call receivers located within the on-site coverage area 11 and can receive ack-back transmissions from selective call receivers located within the on-site coverage area 11. A selective call receiver 18 is depicted located concurrently within the on-site coverage area 11 the wide area coverage area 10.

Figure 2:
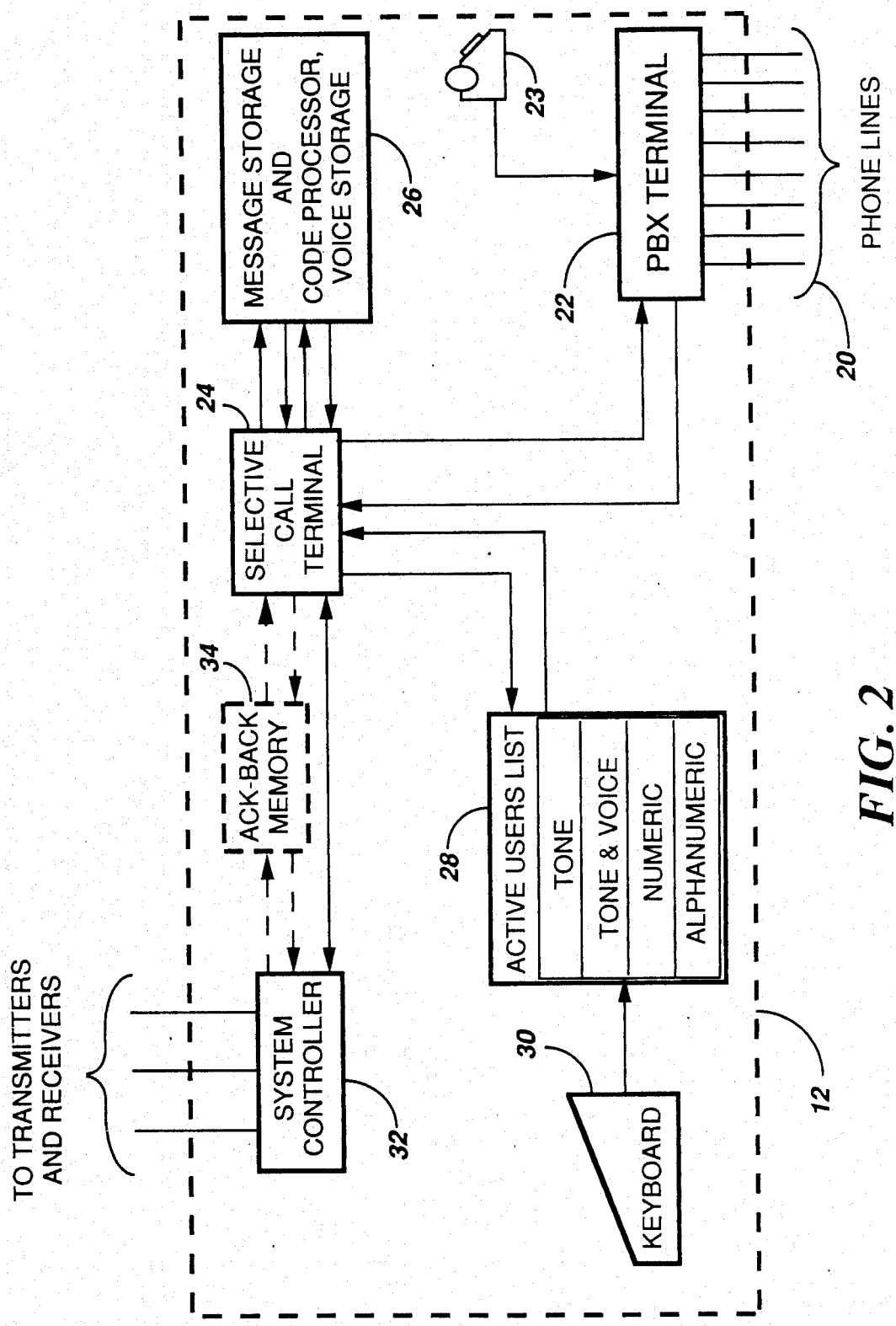
FIG. 2 is a block diagram of the wide area system controller and network terminal according to the preferred embodiment of the present invention.

Referring next to FIG. 2, when an originator of a selective call message wishes to utilize the wide area selective call network for sending information to the selective call receiver 18 by sending a selective call message, the originator contacts the system controller and selective call terminal 12 via one of a plurality of phone lines 20. The phone lines 20 are coupled to a conventional PBX terminal 22. A system phone 23 provides the system operator access to the PBX terminal 22 for system operation. The information is obtained from the originator by means of interactive communication between a selective call terminal 24 and the originator via the phone lines 20 and the PBX 22. The selective call terminal 24 accesses memory 26 for message storing and code processing in order to generate messages for broadcast from tonal information received from the originator via touch-tone telephone line information. The selective call terminal 24 also accesses memory 26 for voice storage to facilitate the interactive communication with the originator. In other selective call network system operations, the selective call terminal 24 and a system controller 32 operate in a manner well known in the art.

The system controller and selective call terminal 12 also maintains in memory an active users list 28 for generation of address data to provide to selective call terminal 24. The active users list is divided according to the format of the selective call messages; for example, those users who have tone only selective call receivers, those users who have tone and voice selective call receivers, those users who have numeric selective call receivers, and those users who have alphanumeric selective call receivers. A keyboard 30 allows the system operator to make entries and changes to the users list 28. Also, the selective call terminal 24 is connected to the memory containing the active users list 28 in a manner that allows the terminal 24 to write to the active users list 28. By contacting the selective call terminal 24, the selective call receiver user can advise the terminal of his movement from or to the wide area network coverage area 10 (FIG. 1).

The system controller 32 is coupled to each of the plurality of transmitters/receivers 14a, 14b and 14c (FIG. 1) for transmission of messages. When selective call receivers have received a message, the selective call receiver, if the system has ack-back capabilities, can transmit an ack-back signal to the system controller 32. The ack-back signal can be an automatic signal which an optional ack-back memory 34 utilizes to verify that the selective call receiver received the message.

Maintenance of the active users list 28 can also be facilitated by the optional ack-back memory 34 which, in operation together with terminal 24, identifies selective call receivers present and operating within coverage area 10 (FIG. 1) by identification of ack-back signals received by the system controller 32 in response to selective call messages transmitted. In addition, periodic polling of all selective call receivers within the network coverage area 10 (FIG. 1) would allow the selective call terminal 24 to continually update the active users list 28.

Figure 3:
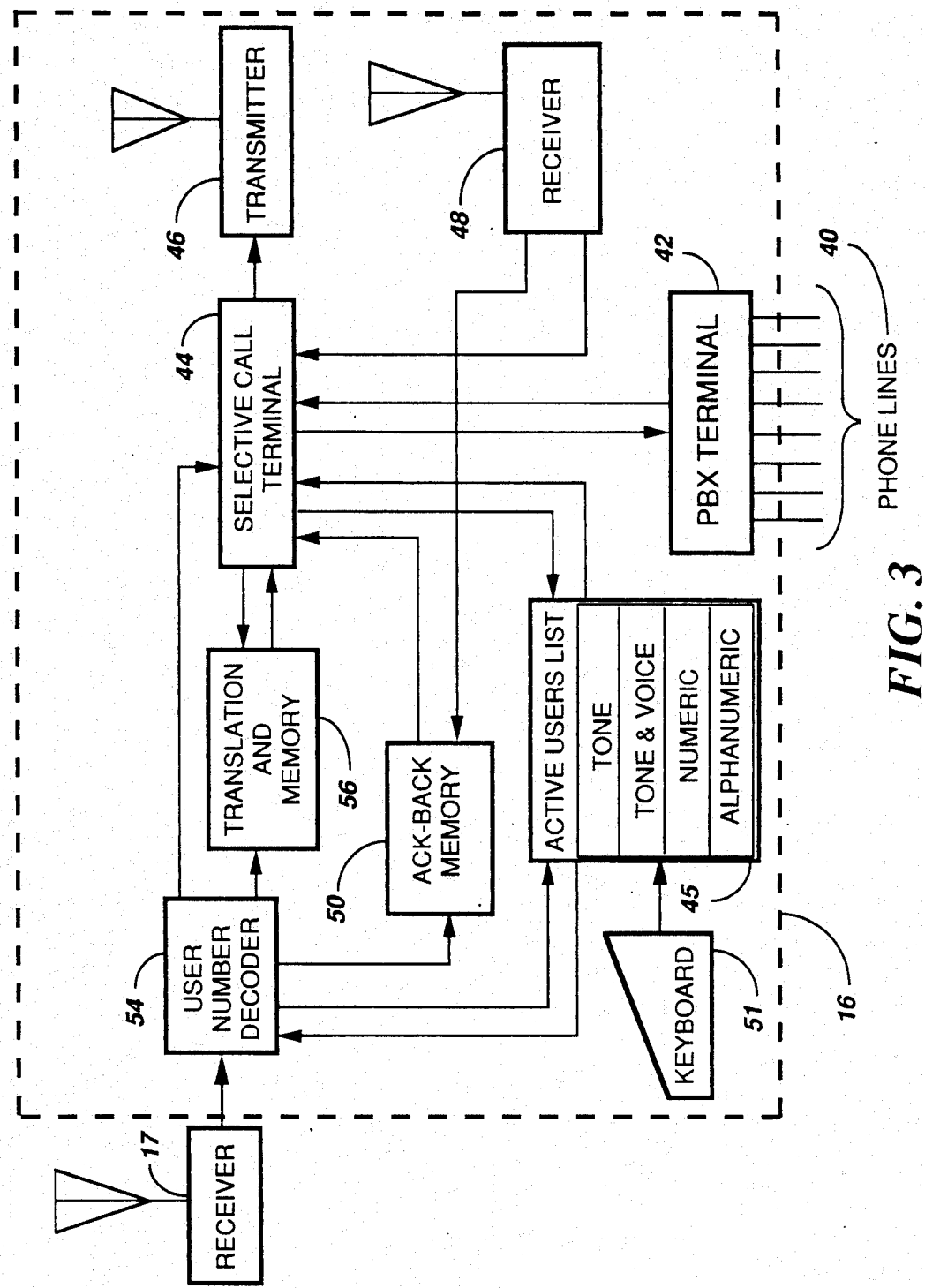
FIG. 3 is a block diagram of the receiver and on-site network terminal according to the preferred embodiment of the present invention.

Referring to FIG. 3, when an originator of a selective call message wishes to utilize the on-site selective call network for sending information to the selective call receiver 18 by sending a selective call message, the originator accesses the on-site selective call network system via a plurality of phone lines 40 and a PBX terminal 42 which is coupled to an on-site selective call terminal 44 in a manner similar to the operation described above for the input access to the wide area selective call terminal. With most on-site network systems, the phone lines 40 are in-house extensions with three- or four-digit extension numbers.

Since the on-site system covers a small area, a single transmitter 46 handles transmission of the selective call messages. It is obvious to one skilled in the art that if an on-site network system had a coverage area comprising several buildings in distinct locations, the selective call terminal 44 could be connected to a plurality of transmitters 46. Also, multiple transmitters 46 could be located on any of a number of floors of a building or within each of several distinct coverage areas to increase the probability of reception. Further, some network systems operate on multiple frequencies which would necessitate a plurality of transmitters 46, one transmitter for each frequency.

For each transmitter 46, a receiver 48 receives ack-back signals from within the on-site network coverage area 11 (FIG. 1). The ack-back information is provided to the selective call terminal 44 and to an ack-back memory 50 which identifies the selective call receiver by its ack-back signal, and supplies the selective call receiver identification information to the selective call terminal 44 aid the terminal 44 in maintaining an active terminal users list 45, that being a list of what selective call receivers are within the on-site coverage area 11 (FIG. 1). In this manner, the selective call terminal 44 maintains information on the location of the various selective call receivers serviced by the on-site selective call network system. For example, in the situation of a hospital, the ack-back capability allows the on-site paging system to maintain an accurate record of the active staff roster. In addition, the ack-back memory 50 can identify the selective call receiver's location as not being on-site. For calls originated on-site through three- or four-digit extension numbers with no acknowledged presence in the ack-back memory 50, the selective call terminal 44 can supply the information to the wide area network system by accessing one of the phone lines 40 via PBX terminal 42, dialing the access code of the wide area system, and then dialing the appropriate seven- or ten-digit number, which in turn would provide the information to selective call terminal 24 via one of phone lines 20 and PBX terminal 22 (FIG. 2) for final routing of the message.

As some on-site systems do not have ack-back capabilities, the active terminal users list 45 can maintain a list of the subscribers on the on-site selective call network system that are paged by the wide area selective call network system and have the wide area selective call messages rebroadcast by the on-site network system. Additions, changes and deletions to the active users list 45 can be made via a keyboard 51 or via the on-site selective call terminal 44.

The receiver 17 within the coverage area 10 (FIG. 1) allows for reception of messages transmitted from the wide area network system. An on-site selective call network system located in a building could locate receiver 17 on the roof of the building for better reception. A user number decoder 54 is coupled to the receiver 17 for decoding the address/message information in selective call transmissions.

If the transmissions are ack-back signals, the ack-back memory 50 identifies the selective call receivers from the ack-back signals and provides the information to selective call terminal 44 to update the active terminal users list 45. If the transmissions are messages, the messages are stored in a translation and memory 56 and the address information is provided to the active users list 45 for a comparison with the on-site active selective call receiver subscriber list. If the selective call receiver is identified as being within the on-site coverage system, the address and its message stored in translation and memory 56 are rebroadcast, i.e. retransmitted, within the on-site network coverage area 11 (FIG. 1) by transmitter 46 via terminal 44, thereby increasing the probability of reception by the selective call receiver. In the preferred embodiment, the translation and memory 56 can detect if the selective call message contains a seven or ten digit number which is an extension accessible directly within the on-site telephone system without accessing the public switched telephone network and can translate the seven or ten digit number in the message to a three- or four-digit extension number for the on-site location.

The selective call terminal 44, the PBX terminal 42, the transmitter 46 comprise a conventional on-site network system controller. The addition of the receiver 48, ack-back memory 50 and active users list 45 and enhanced capabilities of the selective call terminal 44 for maintaining the active terminal users list 45 provide an improved on-site network system controller. In the preferred embodiment, the receiver 17, the user number decoder 54 and the translation and memory 56 would be additional elements coupled to the enhanced on-site network system. The enhanced capabilities can identify a selective call receiver's location for the on-site selective call network system and for the wide area selective call network system. By maintaining the active terminal users list 45, the on-site selective call network system can provide, in an alternate embodiment, for transmission of messages to the wide area selective network system messages intended for on-site system subscribers not present in the on-site network coverage area. The selective call terminal 44 for the on-site system accesses the selective call terminal 24 for the wide area network system by accessing the public switched telephone network via PBX terminal 42 and wide area network system PBX terminal 22. The selective call terminal 44 can translate a three- or four-digit or other length extension number in the selective call message to the equivalent seven or ten digit telephone number that would need to be dialed in the wide area network coverage area 10 (FIG. 1).

Figure 4:
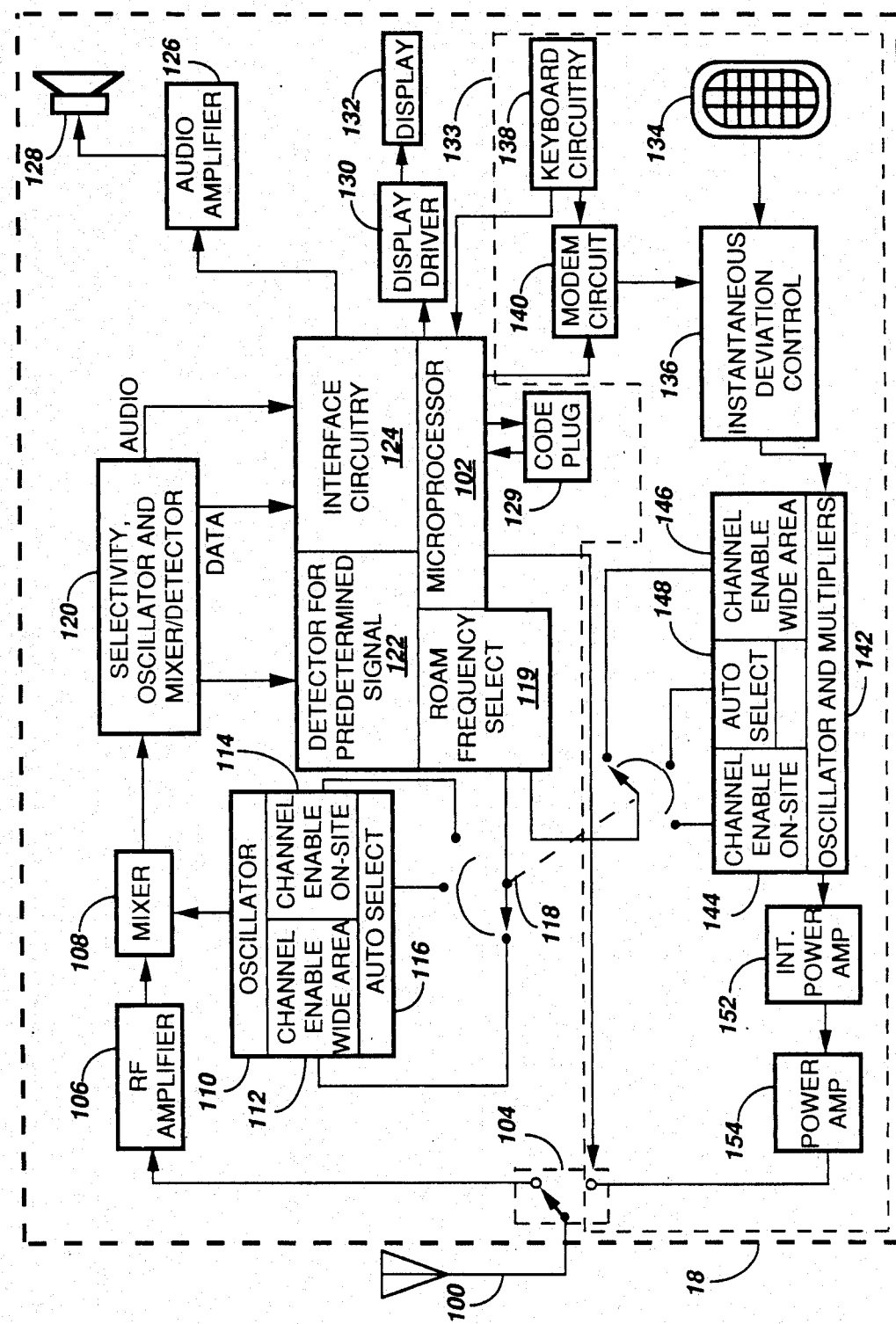
FIG. 4 is a block diagram of the selective call receiver according to the preferred embodiment of the present invention.

Referring next to FIG. 4, a selective call receiver 18 comprises an antenna 100 for receiving and transmitting signals. In an alternate embodiment which provides optional ack-back signalling functions, a microprocessor 102 controls the operation of a receive/transmit switch 104, selectably either providing signals received from the antenna 100 for processing to the selective call receiver 18 or providing the ack-back signals from the selective call receiver 18 to the antenna 100 for transmission.

The signals received by antenna 100 are provided to the input of a radio frequency (RF) amplifier 106. The output of the RF amplifier 106 is provided to one of two inputs of a mixer 108. The other input of the mixer 108 is a signal from an oscillator 110. The frequency of the signal from the oscillator 110 is defined by one of three channel enables: a wide area channel enable 112, an on-site channel enable 114 and an auto select channel roam enable 116. Selection of channel enables 112, 114 or 116 is controlled by a user selectable switch 118. The user selectable switch 118 can be a double pole, triple throw switch which allows the user to select one of the three network channel operating modes for the selective call receiver 18: operation on a wide area channel frequency (the channel enable 112), operation on an on-sight channel frequency (the channel enable 114), or ROAM operation allowing operation on both the wide area and the on-site channel frequencies (the auto select channel roam 116). The auto select channel roam enable 116 toggles back and forth between channel enables 112 and 114 in a manner defined by roam frequency select circuitry 119 and controlled by microprocessor 102, as described below.

The output signal from mixer 108 is provided to a conventional circuitry 120 comprising selectivity, oscillator and mixer/detector circuits for processing the signal received. In a manner well known in the art, the selectivity circuitry eliminates signals on adjacent channels. The oscillator and mixer/detector together with filters and limiters constructed in a manner well known in the art, demodulate the signals and provide an output to interface circuitry 124. The binary data is provided from interface circuitry 124 to microprocessor 102.

In a manner well known in the art, detector circuitry for a predetermined signal 122 recognizes the predetermined on channel received signals. The binary data information provided to the microprocessor 102 is compared with information stored in a code plug 129. If the address of the selective call receiver 18 is detected in the received signals, the microprocessor 102 processes the selective call message received for providing a visual or audio output. If the signals indicate information which is to be visually displayed, the data is provided to a display driver 130, controlled by the microprocessor 102, which provides the information for visual display to a display 132. If the signals indicate information for audio output, the microprocessor 102 controls the flow of the audio signals through interface circuitry 124 to audio amplifier 126 and thence to speaker 128. The microprocessor 102 also controls alert tones by providing generated tones to interface circuitry 124 which are output through speaker 128 via audio amplifier 126.

In an alternate embodiment of the invention, the selective call receiver 18 has circuitry 133 for transmitting an acknowledge back (ack-back) signal to the selective call network terminal 24 (FIG. 2). The ack-back transmissions operate in a manner as described in U.S. Pat. No. 4,825,193 assigned to the assignee of the present invention. The ack-back signals could take the form of preset information stored in the microprocessor 102 and automatically provided for output processing to a modem circuit 140 upon the reception of a selective call message. In a second form, the ack-back signals could comprise digital information either in the form of canned messages stored in the microprocessor 102 and called up by codes input by the selective call receiver user in response to the selective call message through a keyboard 138 or alphanumeric information input by the user in response to the selective call message through the keyboard 138. The digital information from the keyboard 138 is processed through the modem circuitry 140 and then the signals are provided to instantaneous deviation control circuitry 136. The instantaneous deviation control circuitry 136 filters the signals to maintain a specified level of deviation thereby controlling the signals transmitted. Finally, the ack-back signals could take the form of voice signals input at microphone 134 to the instantaneous deviation control circuitry 136. The ack-back transmission could allow for two-way communication, the selective call receiver 18 communicating with the selective call terminal 24 or 44 by ack-back transmissions and receiving responses from the terminal 24 or 44 by selective call transmissions. The choice of a mode for ack-back transmissions is handled by the user through the keyboard 138. An alternate embodiment could allow for a user selectable control for selection of the mode for ack-back transmissions.

The ack-back signals can be transmitted on an ack-back designated frequency or can be transmitted on the same frequency on which the message was received. If the ack-back signals are transmitted on the same frequency as the selective call message was received, the oscillator and multiplier circuitry 142 which prepares the signals for transmission is controlled by one of three channel enables: an on-site channel enable 144, a wide area channel enable 146, and an auto select channel roam enable 148 which are coupled to the second pole of the switch 118. The auto select channel roam enable 148 likewise toggles between the on-site channel enable 144 and the wide area channel enable 146 in a manner prescribed by the frequency select roam circuitry 119 under the control of microprocessor 102. The encoded signal is then provided to an intermediate power amplifier 150 and thence to a power amplifier 152. In ack-back operation mode, antenna 100 is linked to power amplifier 154 for signal transmission by the microprocessor 102 controlling the operation of switch 104.

Figure 5:
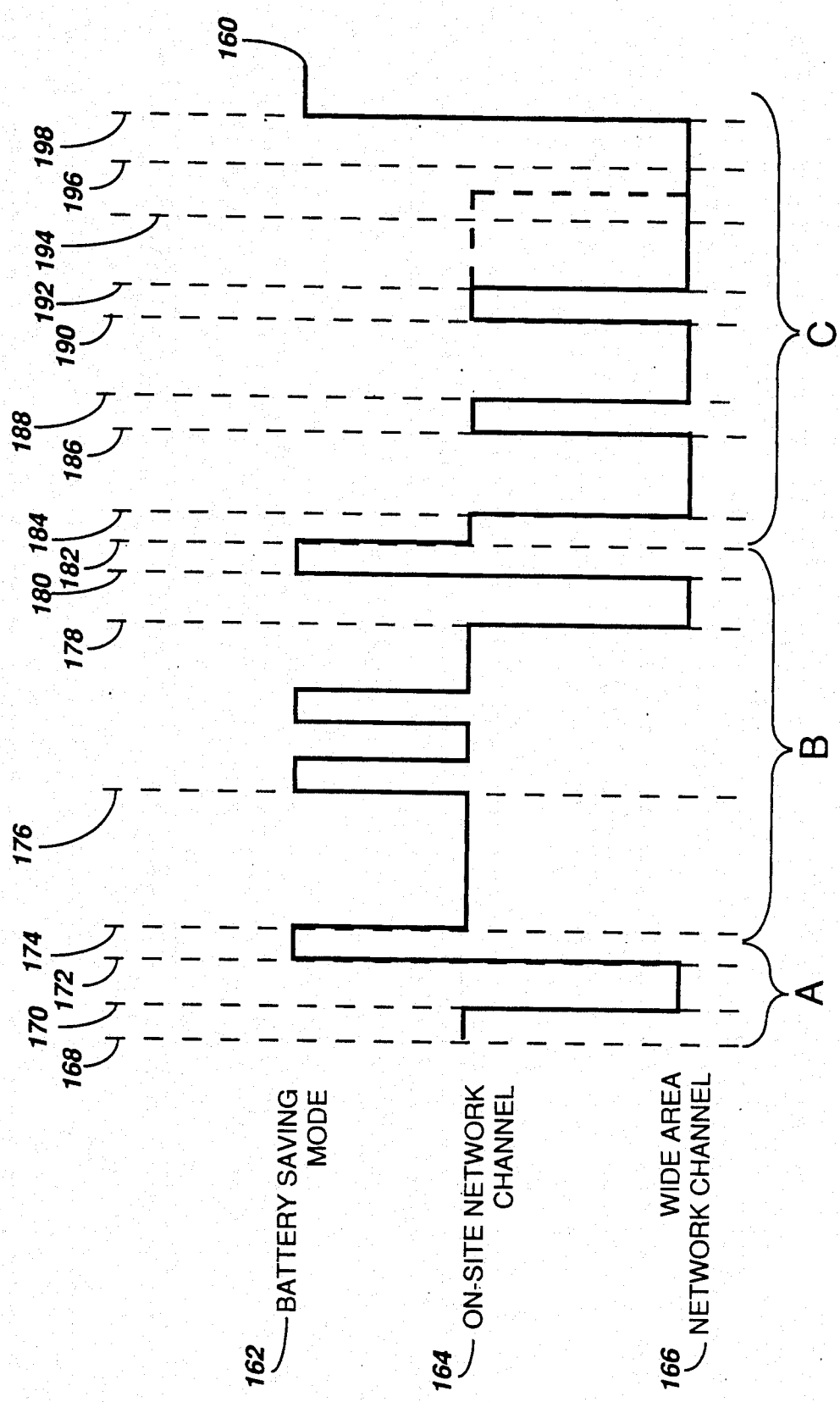
FIG. 5 is a state chart of the operation of the preferred embodiment of the present invention.

Referring next to FIG. 5, a state chart of the operation of the preferred embodiment of the channel scanning feature in the ROAM mode of operation in the frequency select roam circuitry 119 under the control of microprocessor 102 utilizes a preamble code broadcast with the selective call messages. The information transmitted over the on-site and wide area communications paths may utilize either the POCSAG signalling code or the Golay Sequential Code (GSC), or both, however other signalling protocols may be used. POCSAG is a protocol originally proposed by British Telecom and an anagram for the Post Office Code Standardisation Advisory Group. The POCSAG protocol receivers perform separate bit and frame synchronization operations. Bit synchronization is a process used to determine the presence of bit boundaries of a data transmission having bits transmitted at a predetermined baud rate, and thereafter to provide a clock to synchronously sample the bits. Frame synchronization frames the bits transmitted so that the data transmitted is in a form to be decoded thereby indicating various word boundaries such as the first bit of address and data signals.

A preamble of a POCSAG signal comprises a number of zero-to-one transitions for bit synchronization. One method for POCSAG bit synchronization is described in U.S. Pat. No. 4,506,262. The first word following the preamble is a sync code word which contains a predetermined binary sequence used for frame synchronization. Sixteen words of information, each comprising a selective call address and an associated message, follow before the sync code is repeated.

The preamble of a Golay Sequencing Code (GSC) signal, lasting more than one second, contains a repeated twenty-three bit predetermined sequence of signals. In a GSC selective call network, the receivers are divided into a plurality of groups and the twenty three bit code in the preamble selects one of the groups in addition to providing means for bit and frame synchronization. Simultaneous bit and frame synchronization to the GSC signal is disclosed in U.S. Pat. No. 4,424,514. Following the preamble, a start code indicates that the preamble is finished and the information following contains selective call addresses of selective call receivers within the group and messages for those selective call receivers in a pattern of sixteen information words followed by one start code word.

The state chart of FIG. 5 shows the operation of the selective call receiver 18 when receiving messages in the ROAM mode of operation on line 160. In the ROAM mode, the receiver operates in three states in a prescribed manner as depicted, i.e., operating in a battery saving mode 162, receiving messages on the on-site network channel 164, and receiving messages on the wide area network channel 166. Operation in a battery saving mode 162 is automatically selected when the preamble code for the selective call receiver is not detected on either the wide area network channel or the on-site network channel for a predetermined time duration. Operation in a battery saving mode is described in U.S. Pat. No. 4,518,961 assigned to the assignee of the present invention.

State A shows the operation of the selective call receiver 18 when the power is first turned on or after the receiver leaves the battery saving mode of operation at time 168. In the preferred embodiment, the on-site network channel 164 is the frequency of first choice for which the selective call receiver will search after the selective call receiver is powered up or when leaving the battery saving mode. The selective call receiver remains searching for a predetermined signal on the on-site channel for a predetermined time, shown as time 168 to 170. As shown in State A, no predetermined signal is detected and, at time 170, the selective call receiver 18 begins searching for a predetermined signal on the wide area network channel 166. The selective call receiver continues searching for a predetermined signal on the wide area network channel 166 for a second predetermined time, shown as time 170 to 172. As also shown in State A, no predetermined signal indicative of reception of transmissions is detected on the wide area network channel during the second predetermined time and, at time 172, operation of the selective call receiver 18 is switched to the battery saving mode 162.

State B shows the operation of the selective call receiver 18 when its predetermined signal is detected on the on-site network channel 164. When the operation of the selective call receiver 18 leaves the battery saving mode at time 174, the selective call receiver searches for its predetermined signal on the on-site channel for a predetermined time. When the predetermined signal is detected on the on-site channel, the selective call receiver remains on the channel. The length of time (from 174 to 176) the selective call receiver remains on the on-site frequency is chosen to be suitable for the system operation. The length of time is set at a specific predetermined time interval to insure consistent recognition of the required signal is possible in a manner known to those skilled in the art. For a predetermined time after the predetermined signal is seen on the on-site frequency, the selective call receiver periodically alternates between the battery save mode and the on-site channel search for the predetermined signal in a manner known to those skilled in the art. Failure to detect the predetermined signal by time 178, which occurs a predetermined time period after time 176, causes the selective call receiver to switch to the wide area network channel 166 to search for a predetermined signal for a predetermined time, i.e., from time 178 to time 180. None is found during the predetermined time and the selective call receiver changes operation into the battery saving mode 162 at time 180.

State C shows the operation of the selective call receiver 18 when the predetermined signal is detected on the wide area network channel 166. In a like manner as to States A and B, when the operation of the selective call receiver 18 leaves the battery saving mode at time 182, the selective call receiver searches for a predetermined signal on the on-site channel for a predetermined time, shown as time 182 to 184. None is detected and, at time 184, operation of the selective call receiver 18 is switched to the wide area network channel 166. A signal is detected on the wide area network channel and the selective call receiver 18 attempts to detect a predetermined signal and address code within transmissions on the wide area network channel. While examining the transmissions on the wide area network channel, the selective call receiver periodically samples the on-site channel for the presence of a predetermined signal. As shown between times 186 and 188, if none is detected on the on-site channel 164, the operation returns to the wide area network channel 166. While operating on the wide area network channel, the selective call receiver goes into the battery saving mode periodically, as is known to those skilled in the art.

Between times 190 and 192, one of the periodic samples of the on-site frequency for the predetermined time is shown. If no predetermined signal is detected, operation continues on the wide area network channel. If the predetermined signal is detected while the on-site network channel is being sampled, the operation of the selective call receiver remains on the on-site network channel as shown by the dashed line. The selective call receiver will not miss any transmissions on the wide area network channel because those predetermined messages comprising the requisite predetermined signal and address code will be rebroadcast by the on-site network selective call system. At time 194, the selective call receiver loses the predetermined signal on the on-site network channel 164. After a predetermined time, the operation of the selective call receiver returns to the wide area network channel 166. At time 196 the selective call receiver loses the predetermined signal on the wide area network channel and, after a predetermined time of no predetermined signal, at time 198 operation returns to the battery saving mode 162.

Figure 6:
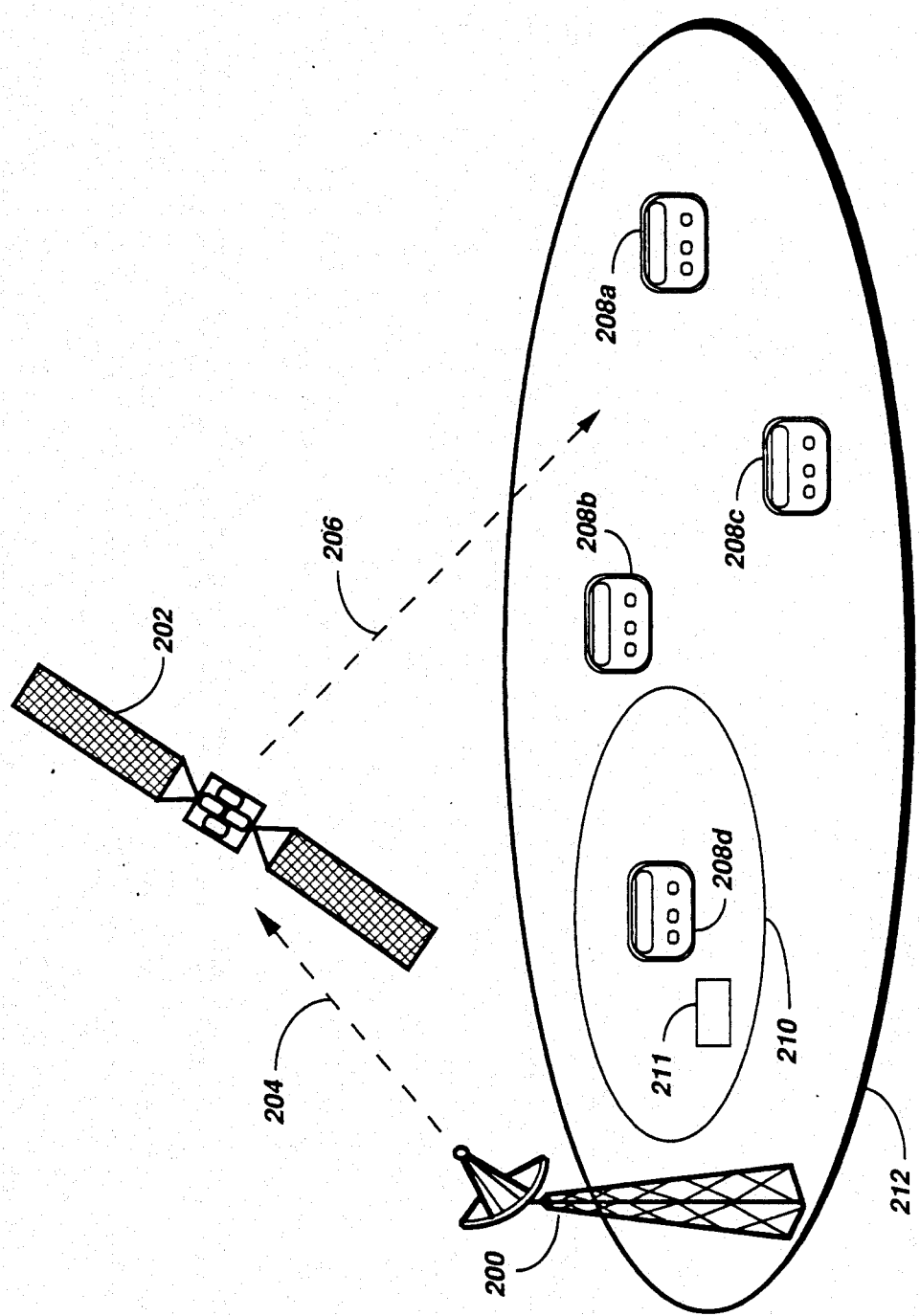
FIGS. 6 and 7 are diagrams of an alternate embodiment of the present invention.
Figure 7:
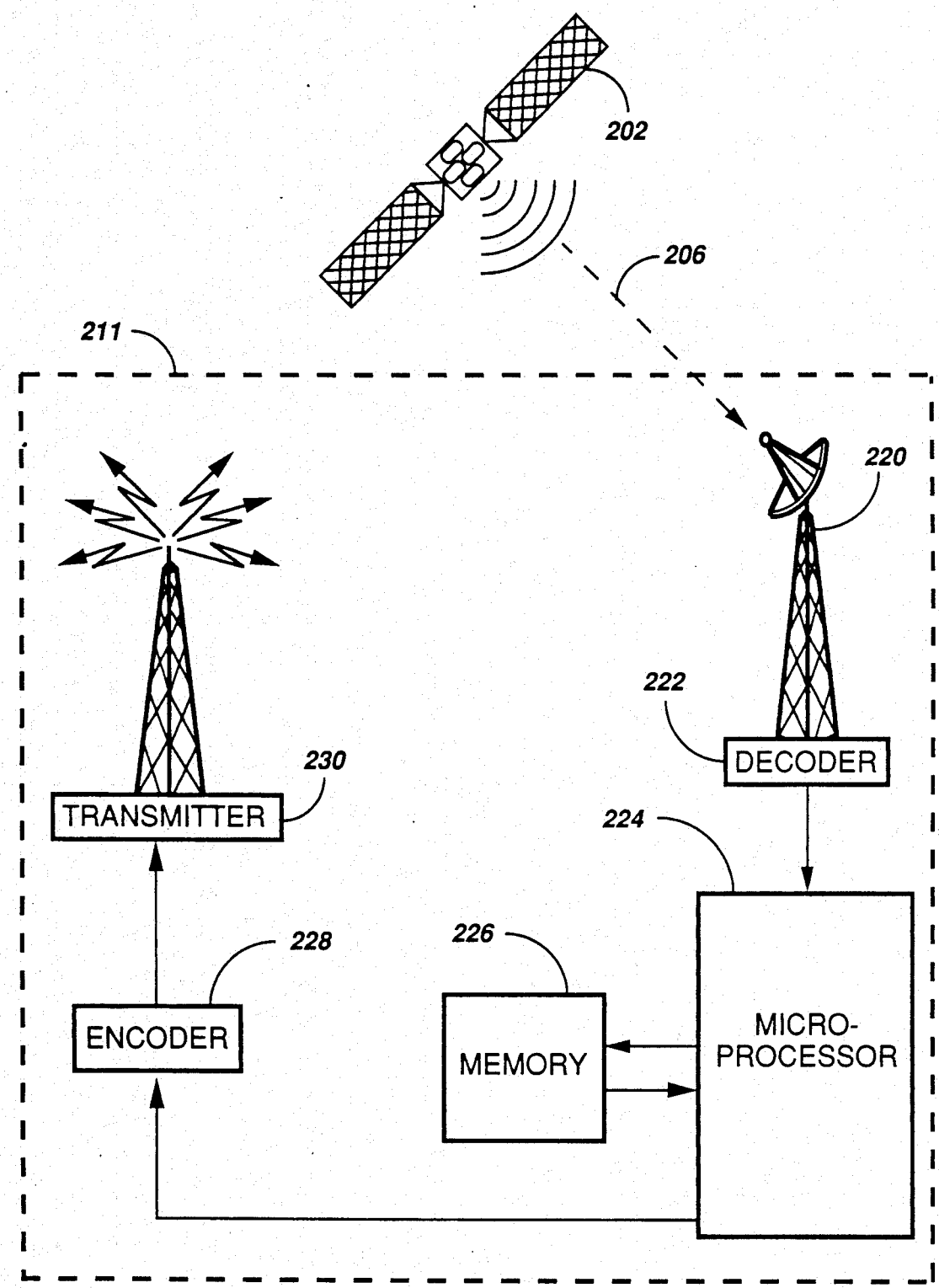

Referring to FIGS. 6 and 7, the fundamentals of the present invention could be utilized to improve satellite selective call network systems such as satellite paging services. Selective call messages could be transmitted from the system controller 32 (FIG. 2) by a ground station 200 to a satellite 202 by means of an up-link connection 204, transmitting information on an up-link channel to a receiving antenna on the satellite 202. The satellite 202 then could relay the transmission via down-link signals 206 to selective call receivers 208a, 208b and 208c. For satellites which maintain a geostationary orbit, the size and location of the footprint 212 would be predictable within a small deviation. For low-orbit satellites which travel well below the geostationary orbit of approximately 22,200 miles, the resultant smaller footprint 212 will be more mobile.

The down link signal 206 from the satellite 202 typically provides reliable reception to a selective call receiver in the open, i.e. not within a building, yet is dependent upon the signal strength at the point of reception. The signal strength is a function of the power used for signal transmission and the distance travelled through the atmosphere by the signal. Power conservation on a satellite is a major concern because power consumption is limited. Thus it is desirable to have low power signal transmissions. Yet, a large amount of power is needed to send signals from a satellite for reliable reception by a pager user within the satellite target area. This is particularly true of signals from geostationary satellites, which typically must travel over twenty two thousand miles and through the atmosphere before reception within the satellite footprint 212. Low orbit satellites also see a decrease in the probability of reliable reception due to interference from terrain factors within the satellite footprint area 212.

Even if the down link signal from the satellite 202 is strong enough for reliable reception by a selective call receiver in the open, the signal from the satellite, though, may not be strong enough for reception by a selective call receiver 208d within or between buildings. Also, the terrestial system's coverage area 210 may not be as large as the satellite footprint 212, decreasing the probability of reliable selective call message reception outside of coverage area 210. To improve the probability of message reception at selective call receiver 208d, a terrestial rebroadcaster 211 is located in an area of buildings and other interfering structures.

Referring to FIG. 7, the terrestial rebroadcaster 211 is depicted wherein the down-link signal 206 according to the present invention is received by a receiver 220 and provided to a decoder 222 for decoding at least the portion of selective call message signals containing the address information. A microprocessor 224 accesses address information stored within a memory 226 to identify which messages are destined for selective call receivers within the network system coverage area 210 (FIG. 6). The identified messages are then re-encoded for transmission by an encoder 228 and transmitted within coverage area 210 by terrestrial transmitter 230 for reception with a high probability of success by selective call receiver 208d. The receiver 220 serves the same function as receiver 17 (FIG. 1) except that the receiver 220 recognizes the satellite frequency. The receiver 220 provides on-site coverage for those selective call receivers in coverage area 210 and wide area coverage for area 212. The selective call receiver 208d is the substantial equivalent of the selective call receiver 18 (FIG. 1) and receives signals in the same manner. With respect to the signal reception by the selective call receiver 208d, the coverage area 210 and 212 serve substantially the same functions as the on-site coverage area 11 and the wide area network system coverage area 10 (FIG. 1).

We claim:

1. A selective call system having a first selective call service and a second selective call service, comprising:
   first RF transmission means for transmitting messages in the first selective call service;
   a first plurality of selective call receivers for receiving said messages transmitted by said first selective call service;

receiving means for receiving said messages transmitted by said first RF transmission means; and second RF transmission means coupled to said receiving means for retransmitting selected ones of said messages over the second selective call service.

2. The selective call system of claim 1 wherein said first selective call service is a satellite paging service.

3. The selective call system of claim 1 wherein said first selective call service is a wide-area paging service and said second selective call service is an on-site paging service.

4. The selective call system of claim 1 wherein said first selective call service is an on-site paging service and said second selective call service is a wide-area paging service.

5. The selective call system of claim 1 further comprising a second plurality of selective call receivers for receiving selective call messages transmitted by said second RF transmission means including said messages received by said receiving means and retransmitted by said second RF transmission means.

6. The selective call system of claim 1 wherein said second RF transmission means comprises:
first memory means for storing a first plurality of addresses;
decoding means coupled to said first receiving means for decoding said messages transmitted by said first RF transmission means, said messages comprising an address portion and an information portion;
comparsion means for comparing the address portion of said messages to said first plurality of addresses;
broadcasting means for transmitting said information portion of one of said messages if said address portion of said one of said messages is substantially equivalent to one of said first plurality of addresses.

7. The selective call system of claim 6 further comprising:
ack-back receiver means for receiving ack-back information received from said second selective call service; and memory maintenance means for adding addresses to or deleting addresses from said first memory means in response to said ack-back information.

8. The selective call system of claim 6 wherein said broadcasting means comprises:
second memory means for storing a second plurality of addresses;
selective call message formation means for forming a selective call message if said address portion of said one of said messages is substantially equivalent to one of said first plurality of addresses by combining said information means of said one of said messages with one of said second plurality of addresses, said one of said second plurality of addresses corresponding to said address portion of said one of said messages; and
transmitting means for broadcasting said selective call message.

9. A method in a first selective call system comprising the steps of:
receiving a first RF signal comprising selective call messages, each of said selective call messages having an address portion and an information portion, said signal transmitted by a second selective call system;
decoding said first RF signal;

decoding ack-back information received from said first selective call network system;
generating and maintaining an active selective call receiver users list having a plurality of addresses determined in response to said ack-back information;
comparing the address portion of each of said selective call messages to each of said addresses included in said active selective call receiver users list;
combining a first selective call system address with said information portion of one of said selective call messages to form a first selective call system message if said address portion of said one of said selective call messages is substantially equivalent to one of said plurality of predetermined addresses, said first selective call system address assigned to a selective call receiver having an address in said second selective call system identified by said address portion of said one of said selective call messages; and
transmitting a second RF signal comprising said first selective call system message.

10. A selective call communications system for communicating messages, each of said messages comprising an address portion and an information portion comprising:
a first radio frequency (RF) transmitter for transmitting a first portion of said messages on a first selective call communications path;
a second RF transmitter for transmitting a second portion of said messages on a second selective call cummunications path;
rebroadcasting means coupled to said second RF transmitter for providing to said second RF transmitter for transmission on said second selective call cammunications path selected ones of said first portion of said messages received on said first selective call communications path, said selected ones of said first portions of said messages selected in response to the address portions thereof; and
at least one selective call receiver, each of said at least one selective call receiver comprising:
receiving means for receiving the messages on said first and second selective call communications paths;
first monitoring means coupled to said receiving means for monitoring said second selective call communications path for one of said messages having a predetermined address portion; and
second monitoring means coupled to said receiving means and said first monitoring means for monitoring said first selective call communications path when said one of said messages having said predetermined address is not present on said second selective call communications path.

11. The selective call communications system of claim 10 wherein said second monitoring means monitors said first selective call communications path from time to time when said predetermined message is not present on said second selective call communications path.

12. A method in a first selective call network system comprising a transmitter for transmitting first paging signals and a receiver for receiving second paging signals transmitted from a second selective call network system for reception by at least one selective call receiver, the method comprising the steps of:

receiving said second paging signals comprising selective call messages, each of said selective call messages having an address portion and an information portion;

decoding said second paging signals;

comparing the address portion of each of said selective call messages to a plurality of predetermined addresses;

combining a first selective call system address with said information portion of one of said selective call messages to form a first selective call system message if said address portion of said one of said selective call messages is substantially equivalent to one of said plurality of predetermined addresses, said first selective call system address assigned to one of said at least one selective call receiver having an address in said second selective call network system identified by said address portion of said one of said selective call messages; and transmitting said first paging signals comprising said first selective call system message.

13. The method of claim 12 wherein said first selective call network system is a wide area network system and said second selective call network system is an on-site network system.

14. The method of claim 12 wherein said first selective call network system is an on-site network system and said second selective call network system is a wide area network system.

15. The method of claim 12 wherein said step of combining the first selective call system address with the information portion to form a first selective call system message comprises the steps of:

determining if said information portion corresponding to said address portion comprises telephone number data if said address portion of said one of said selective call messages is substantially equivalent to one of said plurality of predetermined addresses, said telephone number data having a first telephone number format;

converting said telephone number data from said first telephone number format to a second telephone number format; and combining a first selective call system address corresponding to said address portion with said information portion having telephone number data in said second telephone number format to form a first selective call system message if said address portion of said one of said selective call messages is substantially equivalent to one of said plurality of predetermined addresses.

16. The method of claim 15 wherein said first selective call network system is a wide area selective call network system, said second selective call network system is an on-site selective call network system, said first telephone number format is a seven-digit telephone number format, and said second telephone number format is a four-digit telephone number format.

17. The method of claim 15 wherein said first selective call network system is a wide area selective call network system, said second selective call network system is an on-site selective call network system, said first telephone number format is a seven-digit telephone number format, and said second telephone number format is a three-digit telephone number format.

18. The method of claim 15 wherein said first selective call network system is a wide area selective call network system, said second selective call network system is an on-site selective call network system, said first telephone number format is a ten-digit telephone number format, and said second telephone number format is a four-digit telephone number format.

19. The method of claim 15 wherein said first selective call network system is a wide area selective call network system, said second selective call network system is an on-site selective call network system, said first telephone number format is a ten-digit telephone number format, and said second telephone number format is a three-digit telephone number format.

20. The method of claim 15 wherein said first selective call network system is an on-site selective call network system, said second selective call network system is a wide area selective call network system, said first telephone number format is a four-digit telephone number format, and said second telephone number format is a seven-digit telephone number format.

21. The method of claim 15 wherein said first selective call network system is an on-site selective call network system, said second selective call network system is a wide area selective call network system, said first telephone number format is a three-digit telephone number format, and said second telephone number format is a seven-digit telephone number format.

22. The method of claim 15 wherein said first selective call network system is an on-site selective call network system, said second selective call network system is a wide area selective call network system, said first telephone number format is a four-digit telephone number format, and said second telephone number format is a ten-digit telephone number format.

23. The method of claim 18 wherein said first selective call network system is an on-site selective call network system, said second selective call network system is a wide area selective call network system, said first telephone number format is a three-digit telephone number format, and said second telephone number format is a ten-digit telephone number format.

* * * * *